(12) United States Patent
Bastide et al.

(10) Patent No.: US 11,049,024 B2
(45) Date of Patent: *Jun. 29, 2021

(54) ENHANCEMENT OF MASSIVE DATA INGESTION BY SIMILARITY LINKAGE OF DOCUMENTS

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert E. Loredo, North Miami Beach, FL (US); Dale M. Schultz, Limerick, ME (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 820 days.

This patent is subject to a terminal disclaimer.

(21) Appl. No.: 15/850,674

(22) Filed: Dec. 21, 2017

(65) Prior Publication Data

US 2018/0121812 A1 May 3, 2018

Related U.S. Application Data

(63) Continuation of application No. 14/848,532, filed on Sep. 9, 2015, now Pat. No. 9,916,534, which is a (Continued)

(51) Int. Cl.
*G06F 17/00* (2019.01)
*G06N 5/02* (2006.01)
*G06F 40/106* (2020.01)

(52) U.S. Cl.
CPC .......... *G06N 5/025* (2013.01); *G06F 40/106* (2020.01)

(58) Field of Classification Search
CPC ...... G06F 17/212; G06N 5/025; C07K 14/265
See application file for complete search history.

(56) References Cited

U.S. PATENT DOCUMENTS 7,469,240 B2  12/2008  Tsukamoto
8,037,004 B2  10/2011  Rajkumar et al.
(Continued)

OTHER PUBLICATIONS

Apache Incubator, "ODFDOM—the OpenDocument API," Apache ODF Toolkit (incubating), 2011, p. 1-2, The Apache Software Foundation, http://incubator.apache.org/odftoolkit/odfdom/index.html, Accessed on: Feb. 9, 2015.
IBM, "Analyzing survey text: a brief overview," IBM Business Analytics Software, May 2010, p. 1-11, IBM Corporation.
IBM, "IBM SPSS Statistics Editions," IBM Business Analytics Software, Apr. 2013, p. 1-7, IBM Corporation.
(Continued)

*Primary Examiner* — Luis A Sitiriche
(74) *Attorney, Agent, or Firm* — David Spalding (57) ABSTRACT

A method for ingesting a plurality of content according to a statistical similarity of at least one portion of the ingested plurality of content into an information handling system capable of answering questions, whereby the ingested plurality of content is based on a received topic and ingesting the plurality of content comprises ingesting a plurality of documents associated with the received topic is provided. The method may include determining at least one similarity between each document based on a similarity criteria. The method may also include applying a statistical model to characterize the determined at least one similarity between each document. The method may further include creating at least one pair-wise link for each document. The method may additionally include mapping the created at least one pair-wise link. The method may include generating a plurality of rules for ingesting a plurality of additional content.

20 Claims, 7 Drawing Sheets

Related U.S. Application Data continuation of application No. 14/642,966, filed on Mar. 10, 2015, now Pat. No. 9,916,533.

(56) References Cited

U.S. PATENT DOCUMENTS

| | | | |
|---|---|---|---|
| 8,122,032 | B2 | 2/2012 | Schilit et al. |
| 9,286,290 | B2 | 3/2016 | Allen et al. |
| 9,542,496 | B2 | 1/2017 | Dettman et al. |
| 2002/0010912 | A1 | 1/2002 | Kasvand et al. |
| 2006/0206463 | A1 | 9/2006 | Takachio et al. |
| 2011/0077973 | A1 | 3/2011 | Breitenstein et al. |
| 2012/0136812 | A1 | 5/2012 | Brdiczka |
| 2012/0191716 | A1 | 7/2012 | Omoigui |
| 2014/0046697 | A1* | 2/2014 | Rogers .................. G06Q 50/24 705/3 |
| 2016/0267383 | A1 | 9/2016 | Bastide et al. |
| 2016/0267386 | A1 | 9/2016 | Bastide et al. |

OTHER PUBLICATIONS

Mell et al., "The NIST Definition of Cloud Computing," National Institute of Standards and Technology, Information Technology Laboratory, Oct. 7, 2009, 2 pages, Version 15.

Microsoft, "Microsoft Office—Tools to Get Work Done," Welcome to Office, 2015, p. 1-3, https://products.office.com/en-US/, Accessed on: Feb. 9, 2015.

Oliver et al., "Apache POI—the Java API for Microsoft Documents," The Apache POI Project, Last Updated on Dec. 21, 2014, p. 1-2, The Apache Software Foundation, http://poi.apache.org/index.html, Accessed on: Feb. 9, 2015.

Oracle, "Oracle Outside in Technology," Oracle Fusion Middleware, 2014, p. 1-3.

Wikipedia, "Natural language processing," Wikipedia: the Free Encyclopedia, Last Modified on Feb. 7, 2015, p. 1-10, http://en.wikipedia.org/wiki/Natural_language_processing, Accessed on: Feb. 9, 2015.

\* cited by examiner

ENHANCEMENT OF MASSIVE DATA INGESTION BY SIMILARITY LINKAGE OF DOCUMENTS

BACKGROUND

The present invention relates generally to the field of computers, and more particularly to question and answer systems.

In an unstructured information system, the information sources contain various domains and subdomains of information. The grouping and processing of domains of information enable a precise and domain specific model for question and answer systems. A question and answer system is a system related to the fields of information retrieval and natural language processing (NLP), which is concerned with building systems that automatically answer questions posed by humans in a natural language. In order to generate the corpus of documents for the various domains, the users must generate rules in order to improve the performance and accuracy of the question and answer system.

SUMMARY

According to one embodiment, a method for ingesting a plurality of content according to a statistical similarity of at least one portion of the ingested plurality of content into an information handling system capable of answering questions, whereby the ingested plurality of content is based on a received topic and ingesting the plurality of content comprises ingesting a plurality of documents associated with the received topic is provided. The method may include determining at least one similarity between each document within the ingested plurality of documents based on a similarity criteria. The method may additionally include applying a statistical model to characterize the determined at least one similarity between each document within the ingested plurality of documents. The method may include creating at least one pair-wise link between a word, an image, or a plurality of other media for each document within the ingested plurality of documents based on the applied statistical model. The method may also include mapping the created at least one pair-wise link for a first document within the ingested plurality of documents to at least one other document within the ingested plurality of documents based on a context of the word, the image, or the plurality of other media. The method may include generating a plurality of rules for ingesting a plurality of additional content based on the mapping of the created at least one pair-wise link.

According to another embodiment, a computer system for ingesting a plurality of content according to a statistical similarity of at least one portion of the ingested plurality of content into an information handling system capable of answering questions, whereby the ingested plurality of content is based on a received topic and ingesting the plurality of content comprises ingesting a plurality of documents associated with the received topic is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a topic for ingesting the content. The method may also include ingesting a plurality of documents associated with the topic. The method may further include determining at least one similarity between each document within the ingested plurality of documents based on a similarity criteria. The method may additionally include applying a statistical model to characterize the determined at least one similarity between each document within the ingested plurality of documents. The method may include creating at least one pair-wise link between a word, an image, or a plurality of other media for each document within the ingested plurality of documents based on the applied statistical model. The method may also include mapping the created at least one pair-wise link for a first document within the ingested plurality of documents to at least one other document within the ingested plurality of documents based on a context of the word, the image, or the plurality of other media. The method may include generating a plurality of rules for ingesting a plurality of additional content based on the mapping of the created at least one pair-wise link.

According to yet another embodiment, a computer program product for ingesting a plurality of content according to a statistical similarity of at least one portion of the ingested plurality of content into an information handling system capable of answering questions, whereby the ingested plurality of content is based on a received topic and ingesting the plurality of content comprises ingesting a plurality of documents associated with the received topic is provided. The computer program product may include one or more computer-readable storage devices and program instructions stored on at least one of the one or me tangible storage devices, the program instructions executable by a processor. The computer program product may include program instructions to receive a topic for ingesting the content. The computer program product may also include program instructions to ingest a plurality of documents associated with the topic. The computer program product may further include program instructions to determine at least one similarity between each document within the ingested plurality of documents based on a similarity criteria. The computer program product may additionally include program instructions to apply a statistical model to characterize the determined at least one similarity between each document within the ingested plurality of documents. The computer program product may include program instructions to create at least one pair-wise link between a word, an image, or a plurality of other media for each document within the ingested plurality of documents based on the applied statistical model. The computer program product may also include program instructions to map the created at least one pair-wise link for a first document within the ingested plurality of documents to at least one other document within the ingested plurality of documents based on a context of the word, the image, or the plurality of other media. The computer program product may include program instructions to generate a plurality of rules for ingesting a plurality of additional content based on the mapping of the created at least one pair-wise link.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to question and answer systems. The following described exemplary embodiments provide a system, method and program product to, among other things, enhance massive data ingestion by similarity linkage of documents. Therefore, the present embodiment has the capacity to improve the technical field of question and answer systems by providing a way to improve rule generation from unstructured document linkages. More specifically, the present embodiment may improve document loading or ingestion for a question and answer system by determining the similarity of passages through the linkages between the documents, in order to improve performance and accuracy without the need of a user to generate rules. Additionally, advantages of the present embodiment may include the ability to augment existing search rankings or search context by providing an efficient question and answer (QnA) system.

As previously described, with respect to an unstructured information system, the information sources contain various domains and subdomains of information. The grouping and processing of domains of information enable a precise and domain specific model for question and answer systems. In order to generate the corpus of documents for the various domains, the users must generate rules in order to improve the performance and accuracy of the question and answer system. However, as with any handcrafted system, the system may become fragile and inflexible and expensive to maintain. Additionally, such systems often lack refinement features. As such, it may be advantageous, among other things, to provide a system that improves rule generation from unstructured document linkages.

According to at least one implementation, the present embodiment may link documents based on similarity in portions of content by utilizing a statistical model for enhancement of massive data ingestion. Therefore, the present embodiment may apply a statistical model to generate rules and characterize similarity criteria such as a threshold, between portions of series of documents for ingesting additional content. As such, the present embodiment may ingest content from a first series of documents based on a topic (e.g., question) and thereafter, determining and applying the statistical model (variance, bias, mean, and standard-deviation) to characterize similarity criteria between portions of a series of documents. Additionally, the present embodiment may generate and utilize rules for ingesting additional content and generate linkages based on the statistical model and similarity criteria. The linkages may be hyperlinks between entries based on the similarity criteria such as, a threshold (e.g., context, number of times repeated, confidence, location, and author).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to develop a linkage model that enables the automatic loading of similar documents. As such, the present embodiment may determine linkage or references between documents (similarity being one method), and based on the linkage, may load similar documents based on prior groupings.

According to at least one implementation, a user may pose a question regarding an issue with a product. Then, the present embodiment may acquire documents, both structured and unstructured in format based on a topic associated with the posed question. Next, the present embodiment may ingest an initial list of documents based on the question and determine the similarity of the documents to one another. Then, a pair-wise link may be created between each word, image or other media within the document so that the link may then be mapped to other documents based on the context of the words. Parameters may be generated for a number of granular pair-wise linkage between the document(s) and the method may then create a cluster of absolute valued linkages using various statistical methods such as: Variance, Bias, Mean, Standard-Deviation, etc. The method may also group linkages based on ranking (high, med, low) so as to filter out outliers, or other unwanted linkages. Additionally, rules may be defined based on the pair-wise linkages and the present embodiment may store the rules or refine the rules as more documents are loaded into the system. As such, the present embodiment may use the rules to more efficiently load the documents and the rules may be used as more documents are loaded.

Figure 1:
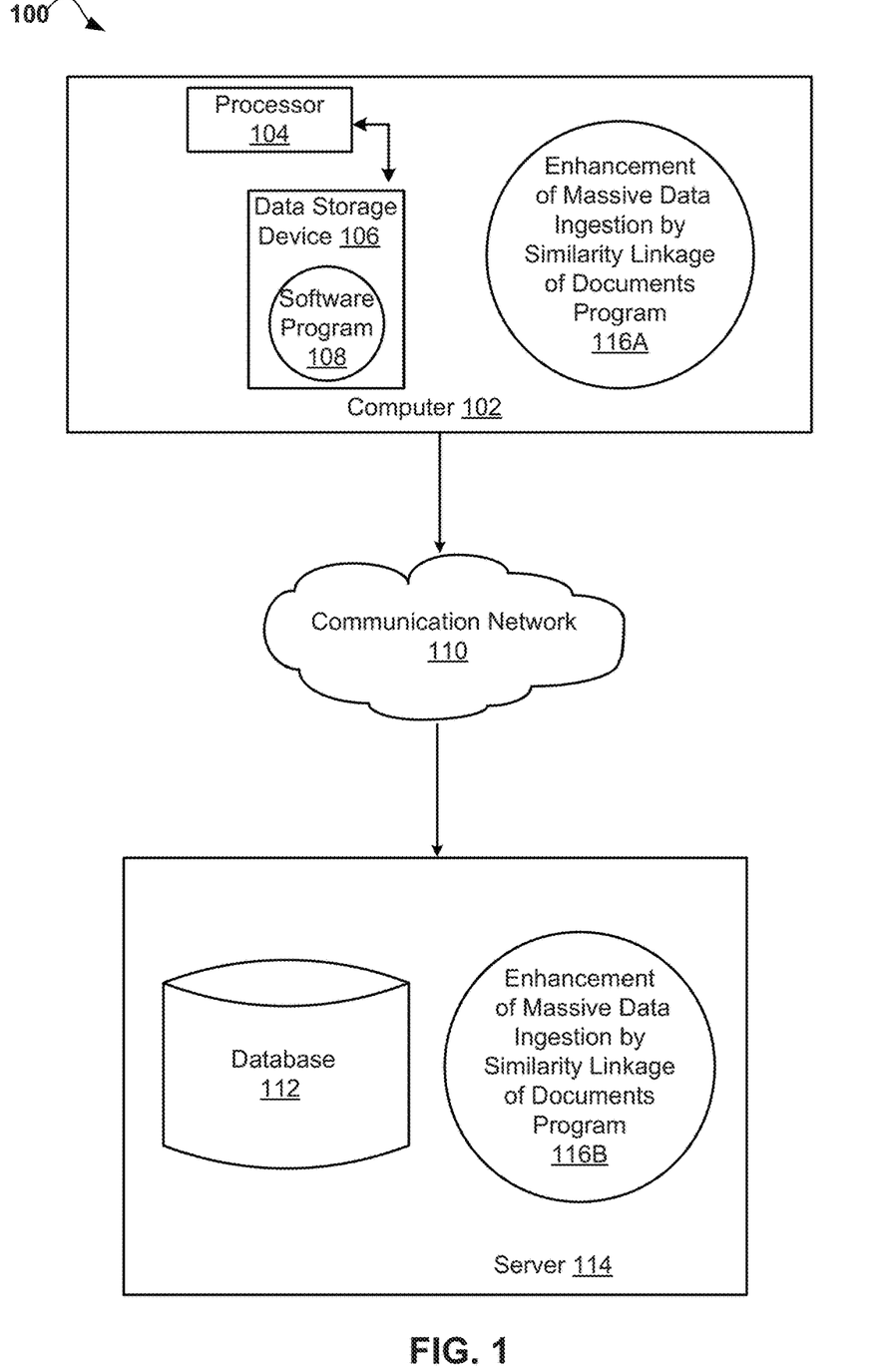
FIG. 1 illustrates a networked computer environment according to one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an Enhancement of Massive Data Ingestion by Similarity Linkage of Documents program 116A. The networked computer environment 100 may also include a server 114 that is enabled to run an Enhancement of Massive Data Ingestion by Similarity Linkage of Documents program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Enhancement of Massive Data Ingestion by Similarity Linkage of Documents program 116B running on server computer 114 via the communications network 110. The communications network 110 may include connections, such as wire, wireless communication links, or fiber optic cables. As will be discussed with reference to FIG. 5, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Enhancement of Massive Data Ingestion by Similarity Linkage of Documents program 116A, 116B may interact with a database 112 that may be embedded in various storage devices, such as, but not limited to a computer/mobile device 102, a networked server 114, or a cloud storage service.

As previously described, the client computer 102 may access the Enhancement of Massive Data Ingestion by Similarity Linkage of Documents program 116B, running on server computer 114 via the communications network 110. For example, a user using a client computer 102 may use the Enhancement of Massive Data Ingestion by Similarity Linkage of Documents program 116A, 116B to improve document loading or ingestion for a question and answer system by determining the similarity of passages through the linkages between the documents in order to improve performance and accuracy without the need of the user to generate rules. The Enhancement of Massive Data Ingestion by Similarity Linkage of documents method is explained in more detail below with respect to FIGS. 2-4.

Figure 2:
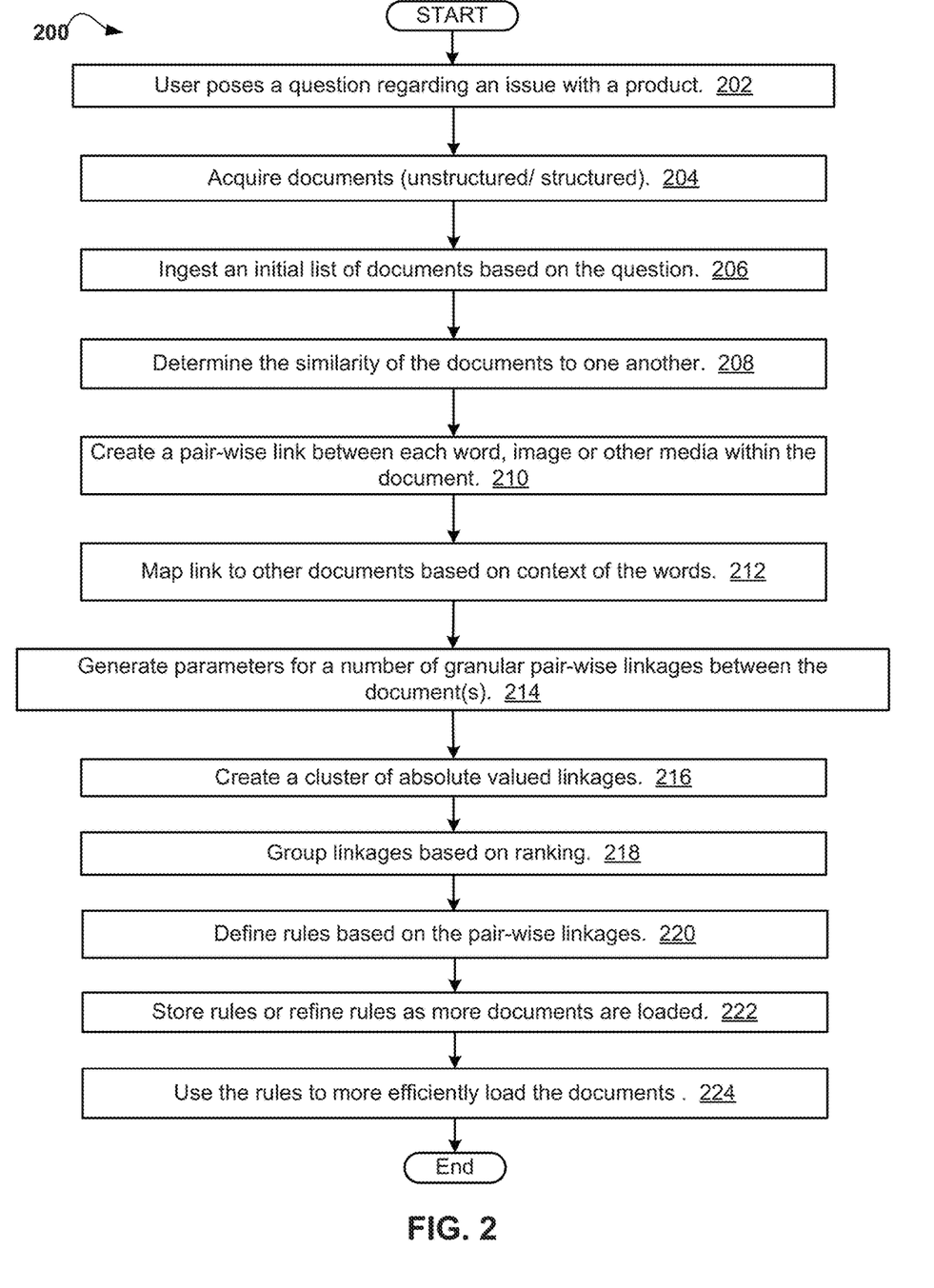
FIG. 2 is an operational flowchart illustrating the steps carried out by a program for enhancement of massive data ingestion by similarity linkage of documents according to at least one embodiment.

Referring now to FIG. 2, an operational flowchart 200 illustrating the steps carried out by a program for the enhancement of massive data ingestion by similarity linkage of documents according to at least one embodiment is depicted. As previously described, the Enhancement of Massive Data Ingestion by Similarity Linkage of Documents program 116A, 116B (FIG. 1) may improve document loading or ingestion for a question and answer system by determining the similarity of passages through the linkages between the documents in order to improve performance and accuracy without the need of a user to generate rules.

Therefore, with respect to FIG. 2 at 202, a user poses a question regarding an issue with a product. For example, a customer may have a problem upgrading a software application product from the older version to the most recent version (e.g., WebSphere Portal v7 to v8).

Then at 204, the Enhancement of Massive Data Ingestion by Similarity Linkage of Documents program 116A, 116B (FIG. 1) acquires documents (unstructured/structured) based on the topic of the posed question. For example, the Enhancement of Massive Data Ingestion by Similarity Linkage of Documents program 116A, 116B (FIG. 1) may acquire documents from various sources including, but on limited to the Internet or a repository, such as a database 112 (FIG. 1). The documents may even be manually loaded into a system by a user.

Next at 206, the Enhancement of Massive Data Ingestion by Similarity Linkage of Documents program 116A, 116B (FIG. 1) ingests an initial list of documents based on the question. For example, the Enhancement of Massive Data Ingestion by Similarity Linkage of Documents program 116A, 116B (FIG. 1) may ingest documents (1-5) 302-310 in FIG. 3 described below.

Then at 208, the Enhancement of Massive Data Ingestion by Similarity Linkage of Documents program 116A, 116B (FIG. 1) determines the similarity of the documents to one another. According to the present embodiment, this determination may be implementation as either a 1-1 relationship or a 1-many. However, for example purposes only, FIG. 3 below illustrates a 1-1 for simplicity.

Next at 210, the Enhancement of Massive Data Ingestion by Similarity Linkage of Documents program 116A, 116B (FIG. 1) creates a pair-wise link between each word, image, or other media within the document. As such, using hypertext to disseminate the contents of the documents, a pair-wise link may be created between each word, image or other media within the document. Then at 212, the link is mapped to other documents based on context of the words. According to at least one implementation, these links can be determined using existing techniques such as NLP and other text mining techniques.

Next at 214, the Enhancement of Massive Data Ingestion by Similarity Linkage of Documents program 116A, 116B (FIG. 1) will generate parameters for a number of granular pair-wise linkages between the document(s). For example, possible linkages may include:

a) Percentage similarity of section (or subsection) of a document to 1 or more other documents;

b) Number of times the similarity is repeated in each document;

c) The location and context of the similarity; and d) Confidence level of similarity (ex: is the author a subject matter expert (SME) of content.

The pairwise linkage may be directed or undirected based on the use of dates to link documents together. For example, direct Document A (created in May 2001) to come before Document B (created in June 2013).

Then at 216, the Enhancement of Massive Data Ingestion by Similarity Linkage of Documents program 116A, 116B (FIG. 1) will create a cluster of absolute valued linkages using various statistical methods such as, variance, bias, mean, standard-deviation, etc.

Next at 218, the Enhancement of Massive Data Ingestion by Similarity Linkage of Documents program 116A, 116B (FIG. 1) may group linkages based on ranking (high, med, low) so as to filter out outliers, or other unwanted linkages.

Then at 220, the Enhancement of Massive Data Ingestion by Similarity Linkage of Documents program 116A, 116B (FIG. 1) may then define rules based on the pair-wise linkages. For example, a rule may be defined for the link with the top 25%. Additionally, the Enhancement of Massive Data Ingestion by Similarity Linkage of Documents program 116A, 116B (FIG. 1) may answer the inverse, which are not the most irrelevant of a topic.

Next at 222, the Enhancement of Massive Data Ingestion by Similarity Linkage of Documents program 116A, 116B (FIG. 1) may store rules or refine the rules as more documents are loaded into the system. The rules may be stored in a repository, such as a database 112 (FIG. 1).

Then at 224, the Enhancement of Massive Data Ingestion by Similarity Linkage of Documents program 116A, 116B (FIG. 1) may use the stored rules to more efficiently load the documents. As such, the stored rules may be used as more documents are loaded. For example, if Document (1) 302 (FIG. 3) is found to be very similar to Document (4) 308 (FIG. 3), then the Enhancement of Massive Data Ingestion by Similarity Linkage of Documents program 116A, 116B (FIG. 1) may load Document (1) 302 (FIG. 3) in a similar plan to Document (4) 308 FIG. 3). The present embodiment may sort the documents to load the most similar documents together. For example, if Document (1) 302 (FIG. 4) is loaded with Document (3) 306 (FIG. 4), Document (5) 310 (FIG. 4), and Document (2) 304 (FIG. 4), an advantage would be that the relevant documents are then available faster if needed since they are loaded together.

It may be appreciated that FIG. 2 provides only an illustration of one implementation and does not imply any limitations with regard to how different embodiments may be implemented. Many modifications to the depicted environments may be made based on design and implementation requirements. For example, the Enhancement of Massive Data Ingestion by Similarity Linkage of Documents program 116A, 116B (FIG. 1) may summarize links as a single annotation between the documents. Additionally, the Enhancement of Massive Data Ingestion by Similarity Linkage of Documents program 116A, 116B (FIG. 1) may have hard and soft links between documents. As such, the soft links may fall below a certain threshold and the hard links may be above a certain threshold (or 100%). Furthermore, various implementations of the present embodiment may develop a model which optimizes massive data ingestion and may add negation links for highly un-correlated documents. The present embodiment may generate models at a higher order than a single word or group, and may be NGrams (a contiguous sequence of n items from a given sequence of text or speech, a sentence, a paragraph or a page). Also, the present embodiment may load the document—in the local view, or on hadoop nodes (a set of algorithms for distributed storage and distributed processing of very large data sets), or in clusters based on similarity.

Figure 3:
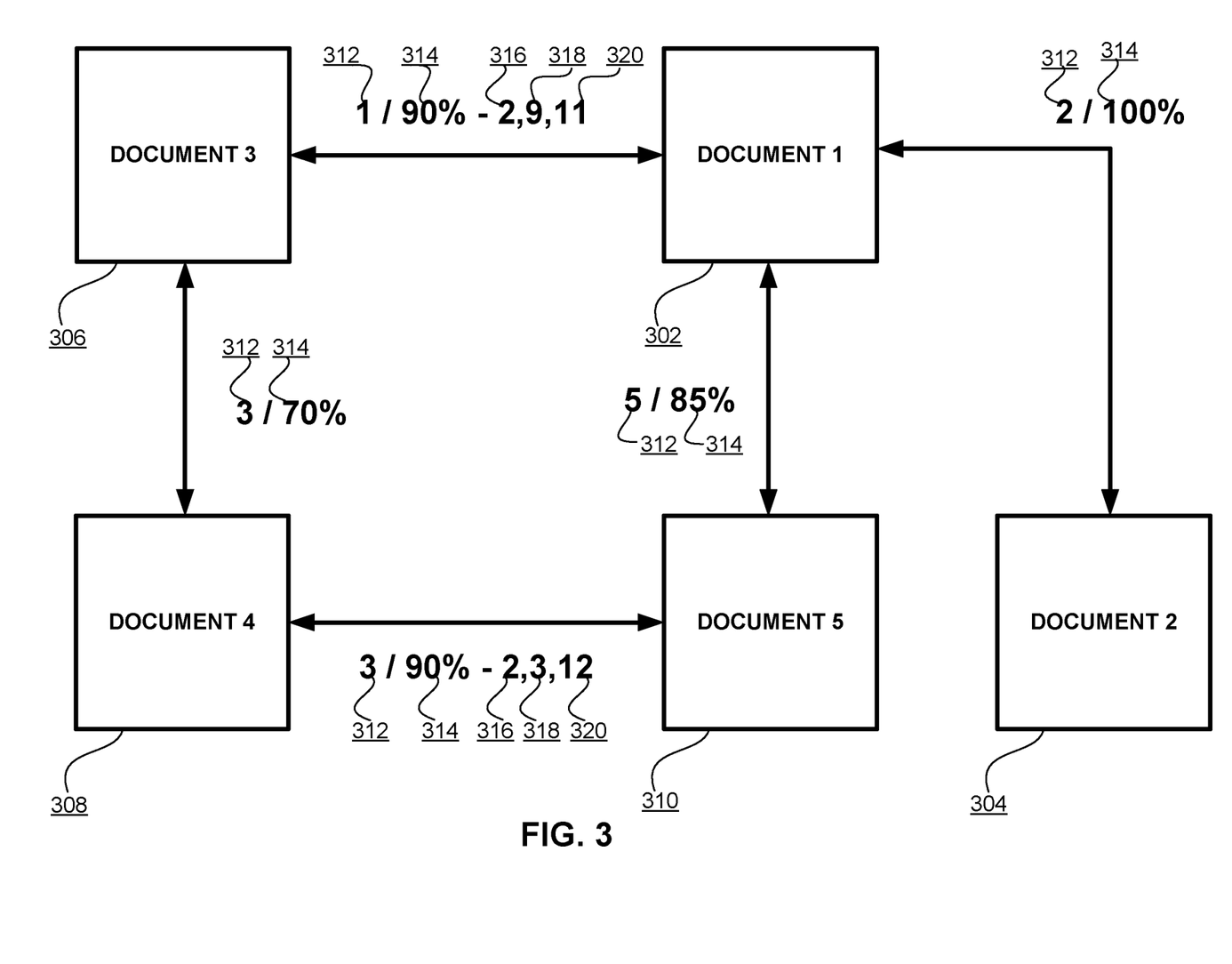
FIG. 3 is an exemplary illustration of a generated model of documents according to at least one embodiment.

Referring now to FIG. 3, an exemplary illustration 300 of a generated model of documents in accordance with one embodiment is depicted. For example, the present embodiment may generate a model 300 based on an existing set of documents 302-310 using the method steps previously described with respect to FIG. 2. As such, with respect to FIG. 3, the parameters may be defined as follows:

Parameter 1: Number of paragraphs 312 with the/percent similarity 314
Parameter 2: Number of times there was a reference back to linked document 316
Parameter 3: Confidence level of author with respect to content 318
Parameter 4: Age difference between linked documents 320.

Figure 4:
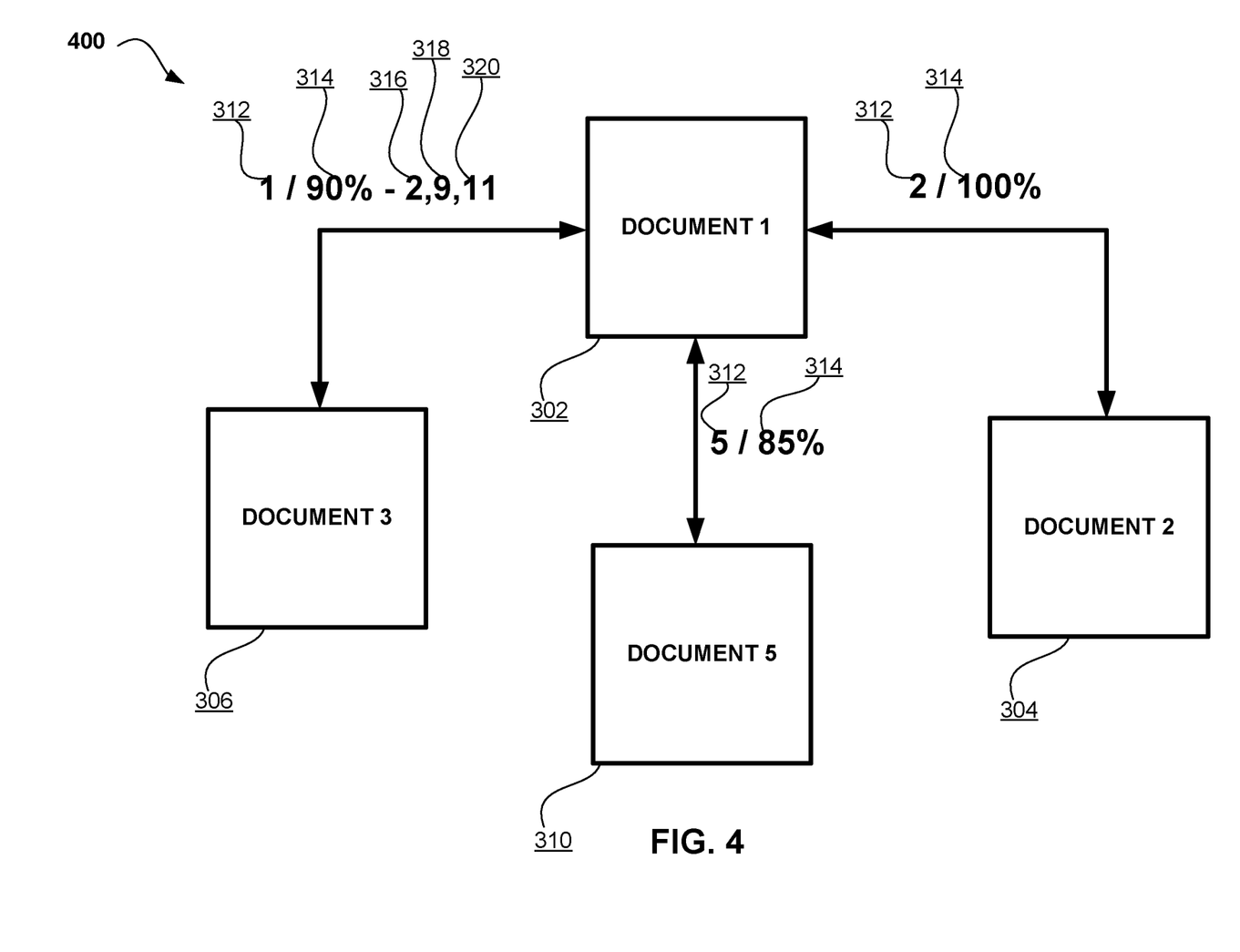
FIG. 4 is an exemplary illustration of loading documents according to at least one embodiment.

Then, based on the generated model 300, particular documents 302-310 may be loaded accordingly as depicted with respect to FIG. 4.

Referring now to FIG. 4, an exemplary illustration 400 loading documents in accordance with one embodiment is depicted. Based on the generated model 300 described with respect to FIG. 3, the present embodiment (as described with respect to the method 200 outlined in FIG. 2) may load document (1) 302, and based on the generated model 300 (FIG. 3), may also know to load document (2) 304, document (3) 306, and document (5) 310, but not document (4) 308 (FIG. 3). According to at least one implementation, the present embodiment may use pairwise linkages to indicate an absence of similarity between documents. For example, regarding Document (3) 306 to Document (5) 310 there is an absence of linkage between the two, as it falls below a threshold.

Figure 5:
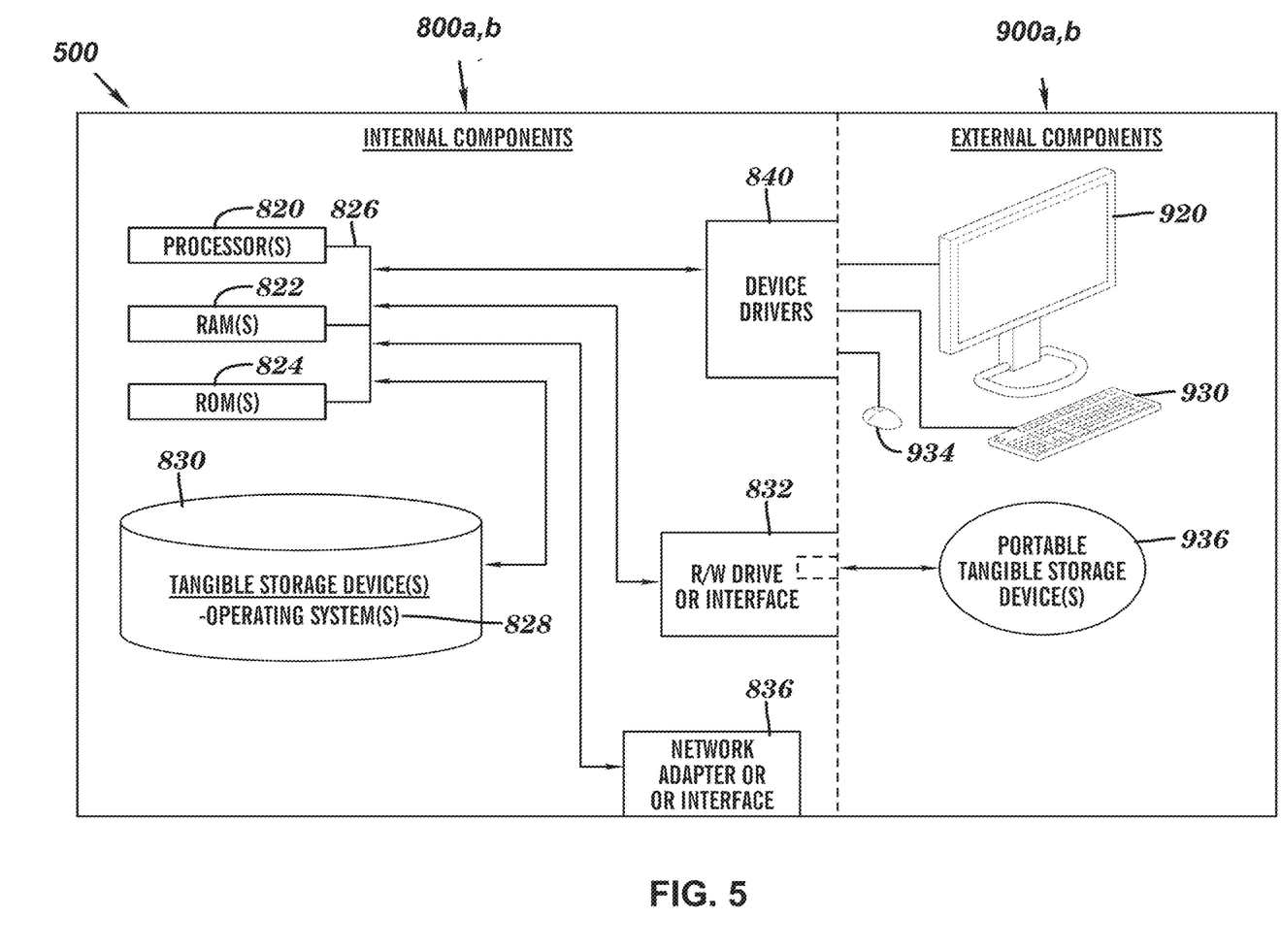
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 5. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Enhancement of Massive Data Ingestion by Similarity Linkage of Documents program 116A (FIG. 1) in client computer 102 (FIG. 1) and the Enhancement of Massive Data Ingestion by Similarity Linkage of Documents program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Enhancement of Massive Data Ingestion by Similarity Linkage of Documents program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Enhancement of Massive Data Ingestion by Similarity Linkage of Documents program 116A (FIG. 1) in client computer 102 (FIG. 1) and the Enhancement of Massive Data Ingestion by Similarity Linkage of Documents program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Enhancement of Massive Data Ingestion by Similarity Linkage of Documents program 116A (FIG. 1) in client computer 102 (FIG. 1) and the Enhancement of Massive Data Ingestion by Similarity Linkage of Documents program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 *a,b* can include a computer display monitor 920, a keyboard 930, and a computer mouse 934. External components 900 *a,b* can also include touch screens, virtual keyboards, touch pads, pointing devices, and other human interface devices. Each of the sets of internal components 800 *a,b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
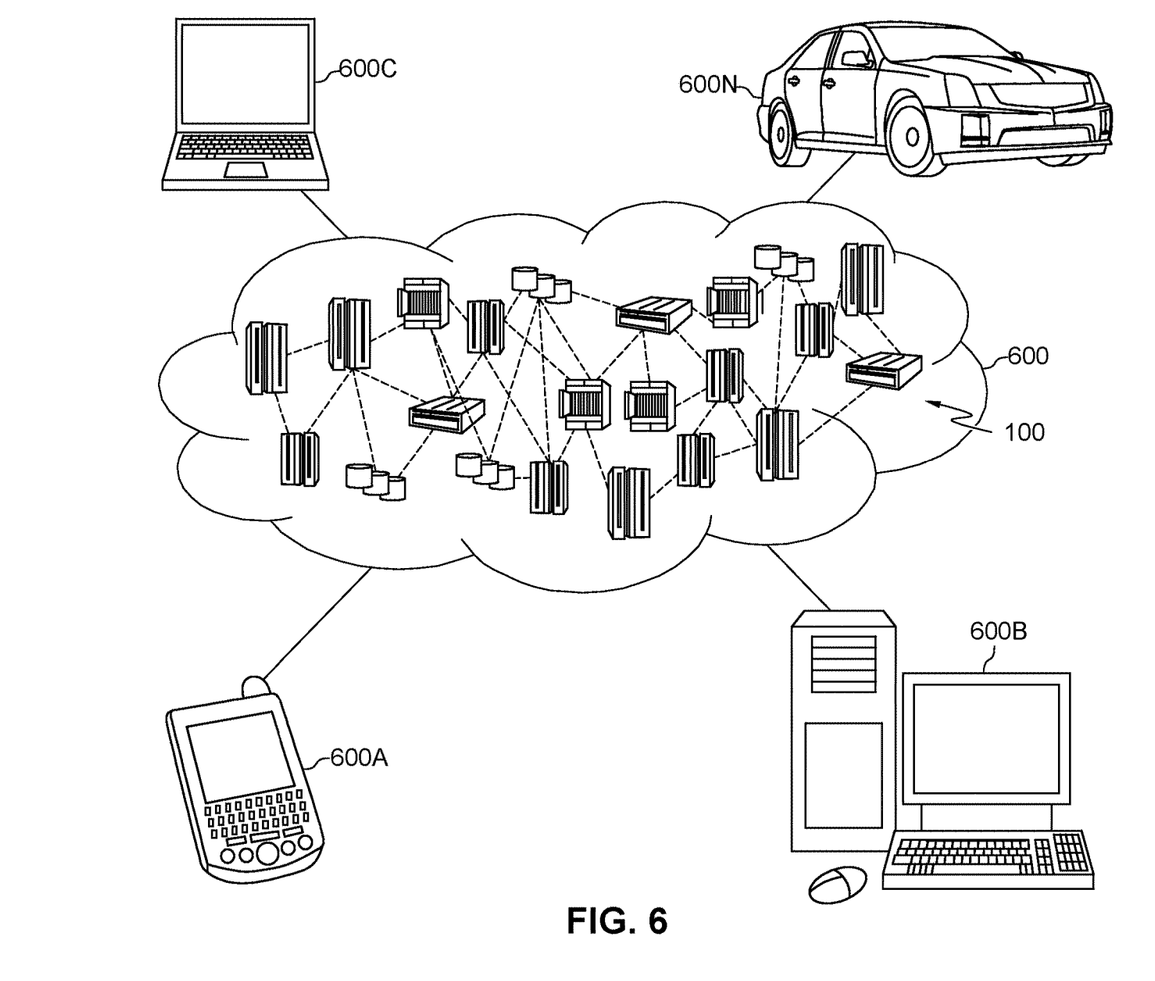
FIG. 6 is a block diagram of an illustrative cloud computing environment including the computer system depicted in FIG. 1, in accordance with an embodiment of the present disclosure.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
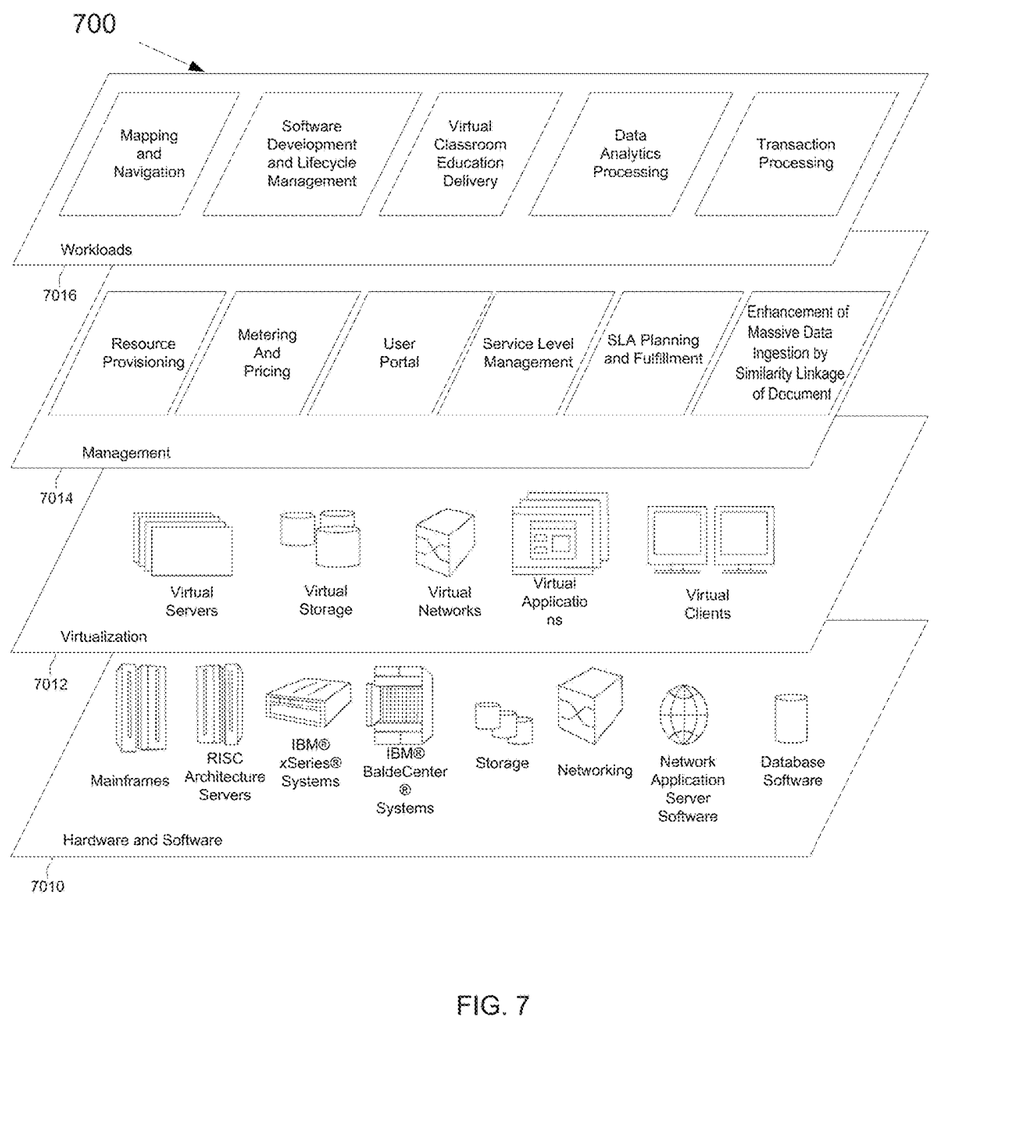
FIG. 7 is a block diagram of functional layers of the illustrative cloud computing environment of FIG. 6, in accordance with an embodiment of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 7010 includes hardware and software components. Examples of hardware components include: mainframes; RISC (Reduced Instruction Set Computer) architecture based servers; storage devices; networks and networking components. In some embodiments, software components include network application server software.

Virtualization layer 7012 provides an abstraction layer from which the following examples of virtual entities may be provided: virtual servers; virtual storage; virtual networks, including virtual private networks; virtual applications and operating systems; and virtual clients.

In one example, management layer 7014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. An Enhancement of Massive Data Ingestion by Similarity Linkage of Documents program may improve document loading or ingestion for a question and answer system by determining the similarity of passages through the linkages between the documents in order to improve performance and accuracy without the need of the user to generate rules.

Workloads layer 7016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for ingesting a plurality of content according to a statistical similarity of at least one portion of the ingested plurality of content into an online information handling system running on a first computer and capable of answering questions, wherein the ingested plurality of content is based on a received topic entered on a second computer and ingesting the plurality of content comprises ingesting a plurality of documents associated with the received topic, wherein the ingested plurality of documents are acquired from searching a plurality of online sources including a plurality of repositories and internet, the method comprising:

determining at least one similarity between each document within the ingested plurality of documents based on a similarity criteria;

applying a statistical model to characterize the determined at least one similarity between each document within the ingested plurality of documents;

creating at least one pair-wise link between a word, an image, or a plurality of other media for each document within the ingested plurality of documents based on the applied statistical model;

mapping the created at least one pair-wise link for a first document within the ingested plurality of documents to at least one other document within the ingested plurality of documents based on a context of the word, the image, or the plurality of other media;

generating a plurality of rules for ingesting a plurality of additional content based on the mapping of the created at least one pair-wise link;

storing the generated plurality of rules in an online repository;

retrieving and utilizing the stored plurality of rules when a plurality of future documents are loaded into the online information handling system;

creating a plurality of hard and soft links between a word, an image, or a plurality of other media for each document within the ingested plurality of documents based on the applied statistical model, wherein each hard link within the plurality of hard and soft links meets or exceeds a predetermined threshold and each soft link within the plurality of hard and soft links falls below a predetermined threshold; and creating a single annotation between each document within the ingested plurality of documents based on each hard link and each soft link within the plurality of hard and soft links.

2. The method of claim 1, further comprising:

utilizing the generated plurality of rules for ingesting the plurality of additional content.

3. The method of claim 1, wherein the ingested plurality of documents comprises unstructured or structured documents.

4. The method of claim 1, wherein the received topic is determined from a question.

5. The method of claim 1, wherein the created at least one pair-wise link is a hyperlink between at least two documents within the ingested plurality of documents and is created using text mining techniques.

6. The method of claim 1, wherein the similarity criteria is a threshold based on at least one of a plurality of context, a number of times repeated, a confidence, a location, and an author.

7. The method of claim 1, wherein the statistical model is selected from a group comprising of at least one of a variance, a bias, a mean, and a standard deviation.

8. The method of claim 1, wherein the at least one pair-wise linkage is directed or undirected.

9. The method of claim 1, wherein the ingesting of a plurality of additional content is optimized according to the similarity criteria and the statistical model selected from a group consisting of at least one of a word, a group, a plurality of NGrams, a sentence, a paragraph, a page, a plurality of Hadoop nodes, and a plurality of clusters.

10. A computer system for ingesting a plurality of content according to a statistical similarity of at least one portion of the ingested plurality of content into an online information handling system running on a first computer and capable of answering questions, wherein the ingested plurality of content is based on a received topic entered on a second computer and ingesting the plurality of content comprises ingesting a plurality of documents associated with the received topic, wherein the ingested plurality of documents are acquired from searching a plurality of online sources including a plurality of repositories and internet, the computer system comprising:
  one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
  determining at least one similarity between each document within the ingested plurality of documents based on a similarity criteria;
  applying a statistical model to characterize the determined at least one similarity between each document within the ingested plurality of documents;
  creating at least one pair-wise link between a word, an image, or a plurality of other media for each document within the ingested plurality of documents based on the applied statistical model;
  mapping the created at least one pair-wise link for a first document within the ingested plurality of documents to at least one other document within the ingested plurality of documents based on a context of the word, the image, or the plurality of other media;
  generating a plurality of rules for ingesting a plurality of additional content based on the mapping of the created at least one pair-wise link;
  storing the generated plurality of rules in an online repository;
  retrieving and utilizing the stored plurality of rules when a plurality of future documents are loaded into the online information handling system;
  creating a plurality of hard and soft links between a word, an image, or a plurality of other media for each document within the ingested plurality of documents based on the applied statistical model, wherein each hard link within the plurality of hard and soft links meets or exceeds a predetermined threshold and each soft link within the plurality of hard and soft links falls below a predetermined threshold; and
  creating a single annotation between each document within the ingested plurality of documents based on each hard link and each soft link within the plurality of hard and soft links.

11. The computer system of claim 10, further comprising: utilizing the generated plurality of rules for ingesting the plurality of additional content.

12. The computer system of claim 10, wherein the ingested plurality of documents comprises unstructured or structured documents.

13. The computer system of claim 10, wherein the received topic is determined from a question.

14. The computer system of claim 10, wherein the created at least one pair-wise link is a hyperlink between at least two documents within the ingested plurality of documents and is created using text mining techniques.

15. The computer system of claim 10, wherein the similarity criteria is a threshold based on at least one of a plurality of context, a number of times repeated, a confidence, a location, and an author.

16. The computer system of claim 10, wherein the statistical model is selected from a group comprising of at least one of a variance, a bias, a mean, and a standard deviation.

17. The computer system of claim 10, wherein the at least one pair-wise linkage is directed or undirected.

18. The computer system of claim 10, wherein the ingesting of a plurality of additional content is optimized according to the similarity criteria and the statistical model selected from a group consisting of at least one of a word, a group, a plurality of NGrams, a sentence, a paragraph, a page, a plurality of Hadoop nodes, and a plurality of clusters.

19. A computer program product for ingesting a plurality of content according to a statistical similarity of at least one portion of the ingested plurality of content into an online information handling system running on a first computer and capable of answering questions, wherein the ingested plurality of content is based on a received topic entered on a second computer and ingesting the plurality of content comprises ingesting a plurality of documents associated with the received topic, wherein the ingested plurality of documents are acquired from searching a plurality of online sources including a plurality of repositories and internet, the computer program product comprising:
  one or more computer-readable non-transitory storage devices and program instructions stored on at least one of the one or more computer readable non-transitory storage devices, the program instructions executable by a processor, the program instructions comprising:
  program instructions to determine at least one similarity between each document within the ingested plurality of documents based on a similarity criteria;
  program instructions to apply a statistical model to characterize the determined at least one similarity between each document within the ingested plurality of documents;
  program instructions to create at least one pair-wise link between a word, an image, or a plurality of other media for each document within the ingested plurality of documents based on the applied statistical model;
  program instructions to map the created at least one pair-wise link for a first document within the ingested plurality of documents to at least one other document within the ingested plurality of documents based on a context of the word, the image, or the plurality of other media;

program instructions to generate a plurality of rules for ingesting a plurality of additional content based on the mapping of the created at least one pair-wise link;

program instructions to store the generated plurality of rules in an online repository;

program instructions to retrieve and utilize the stored plurality of rules when a plurality of future documents are loaded into the online information handling system;

program instructions to create a plurality of hard and soft links between a word, an image, or a plurality of other media for each document within the ingested plurality of documents based on the applied statistical model, wherein each hard link within the plurality of hard and soft links meets or exceeds a predetermined threshold and each soft link within the plurality of hard and soft links falls below a predetermined threshold; and program instructions to create a single annotation between each document within the ingested plurality of documents based on each hard link and each soft link within the plurality of hard and soft links.

20. The computer program product of claim 19, further comprising:

program instructions to utilize the generated plurality of rules for ingesting the plurality of additional content.

* * * * *